(12) United States Patent
Zimmer

(10) Patent No.: US 7,387,306 B2
(45) Date of Patent: Jun. 17, 2008

(54) DOLLY

(75) Inventor: Jürgen Zimmer, Koblenz (DE)

(73) Assignee: Woflcraft GmbH (DE)

( * ) Notice: Subject to any disclaimer, the term of this patent is extended or adjusted under 35 U.S.C. 154(b) by 373 days.

(21) Appl. No.: 10/502,997

(22) PCT Filed: Jan. 15, 2003

(86) PCT No.: PCT/EP03/00321

§ 371 (c)(1),
(2), (4) Date: Feb. 9, 2005

(87) PCT Pub. No.: WO03/064235

PCT Pub. Date: Aug. 7, 2003

(65) Prior Publication Data
US 2005/0127625 A1    Jun. 16, 2005

(30) Foreign Application Priority Data

Jan. 29, 2002 (DE) ............... 102 04 439
May 27, 2002 (DE) ............... 102 23 459
Dec. 23, 2002 (DE) ............... 102 60 719

(51) Int. Cl.
    B62B 1/12    (2006.01)
(52) U.S. Cl. ............ 280/47.29; 280/47.27; 280/47.24; 280/47.18; 280/40; 280/645; 280/646
(58) Field of Classification Search ............ 280/47.29, 280/47.28, 47.27, 47.24, 47.21, 47.18, 47.17, 280/47.131, 639, 38, 39, 40, 641, 642, 643, 280/645, 646, 651, 652, 654
See application file for complete search history.

(56) References Cited

U.S. PATENT DOCUMENTS 3,659,867 A    5/1972    Curry (Continued)

FOREIGN PATENT DOCUMENTS

EP    0688711    12/1995

(Continued)

Primary Examiner—Christopher P. Ellis
Assistant Examiner—John D Walters
(74) Attorney, Agent, or Firm—Bell, Boyd & Lloyd LLP

(57) ABSTRACT

A dolly has a carrying frame (1) provided with a scoop (2) which is coupled to an end of said frame in such a way that it can pivot about a pivoting axis (3). The scoop is movably coupled, by a control mechanism, to two wheel carriers which can be respectively pivoted about a bearing axis extending transversally in relation to the pivoting axis (3) of the scoop and which carry running wheels (4), in such a way that when the scoop is pivoted, the wheel carriers pivot out of a storage position oriented parallel to the carrying frame (1), into a use position which is perpendicular to the frame and in which the wheel carriers are oriented parallel to each other. The dolly is provided with an actuating handle (6) which can be pivoted about an axis parallel to the scoop axis (3) and which is movably coupled to the scoop (2) by a connecting rod (7). When the handle (6) is pivoted from an idle position into an intermediate position, the wheel carriers (5) pivot out of their storage position into their position of use, and when the handle (6) is further pivoted into an end position in which it (6) fixes the two wheel carriers (5) in a pivoting manner, a clamping force is exerted on the connecting rod (7).

33 Claims, 21 Drawing Sheets

U.S. PATENT DOCUMENTS

| | | | |
|---|---|---|---|
| 3,788,659 A | | 1/1974 | Allen |
| 5,281,044 A | * | 1/1994 | Chen .......................... 403/328 |
| 5,439,239 A | * | 8/1995 | Su ............................... 280/40 |
| 5,468,005 A | | 11/1995 | Yang |
| 5,468,055 A | | 11/1995 | Simon et al. |
| 5,803,471 A | | 9/1998 | DeMars et al. |
| 5,984,327 A | * | 11/1999 | Hsieh et al. ............. 280/47.24 |
| 6,053,514 A | * | 4/2000 | Su ............................... 280/40 |
| 6,698,789 B2 | * | 3/2004 | Reimers et al. ............. 280/651 |
| 6,715,774 B2 | * | 4/2004 | Cassoni ................. 280/47.131 |
| 2002/0180184 A1 | * | 12/2002 | Chang ........................ 280/652 |

FOREIGN PATENT DOCUMENTS

| | | |
|---|---|---|
| EP | 1472128 | 2/2007 |

* cited by examiner

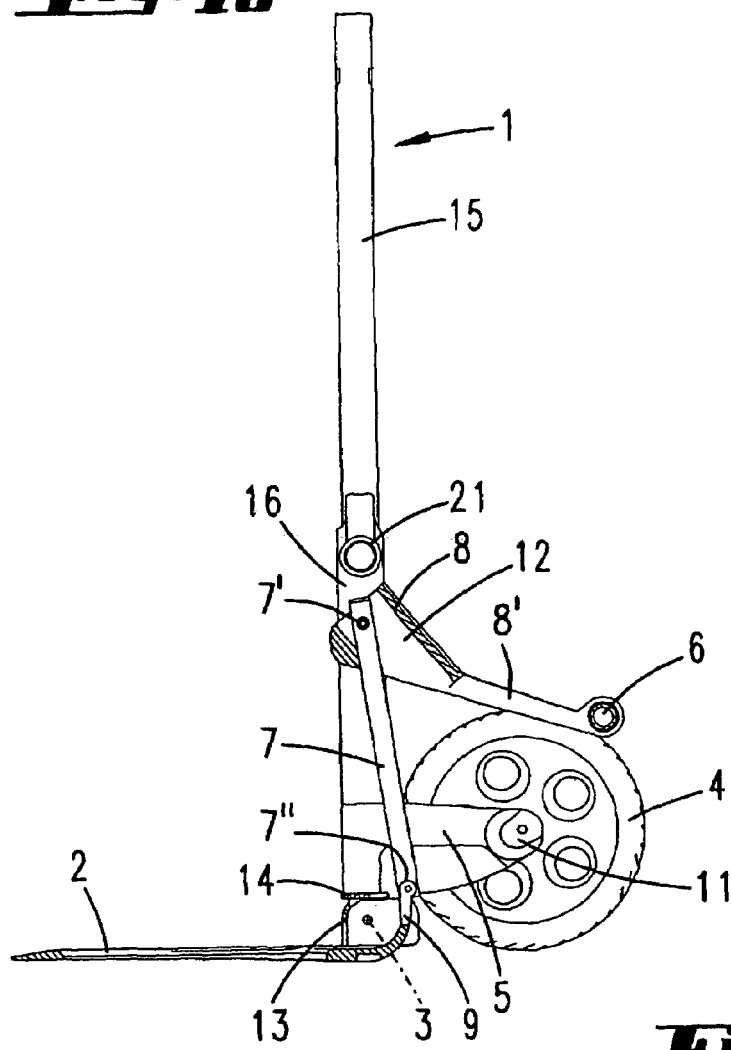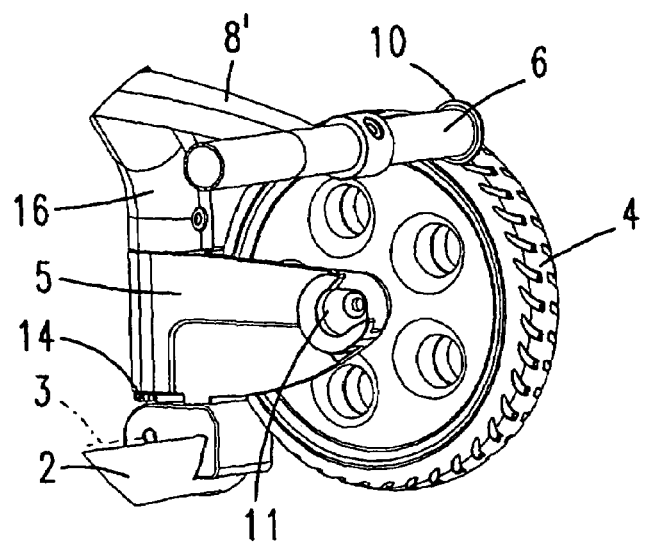

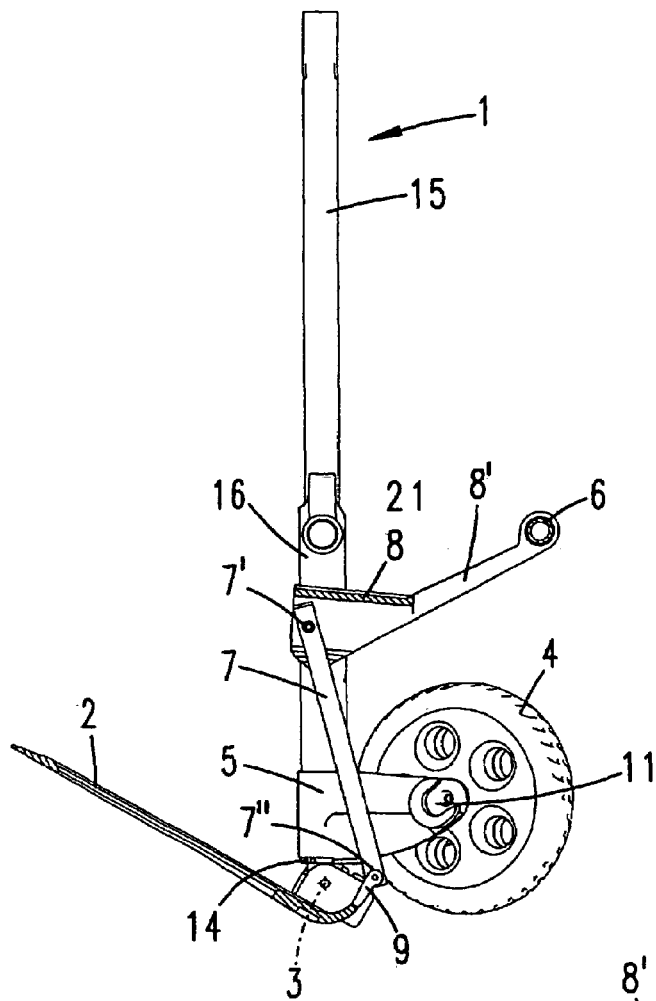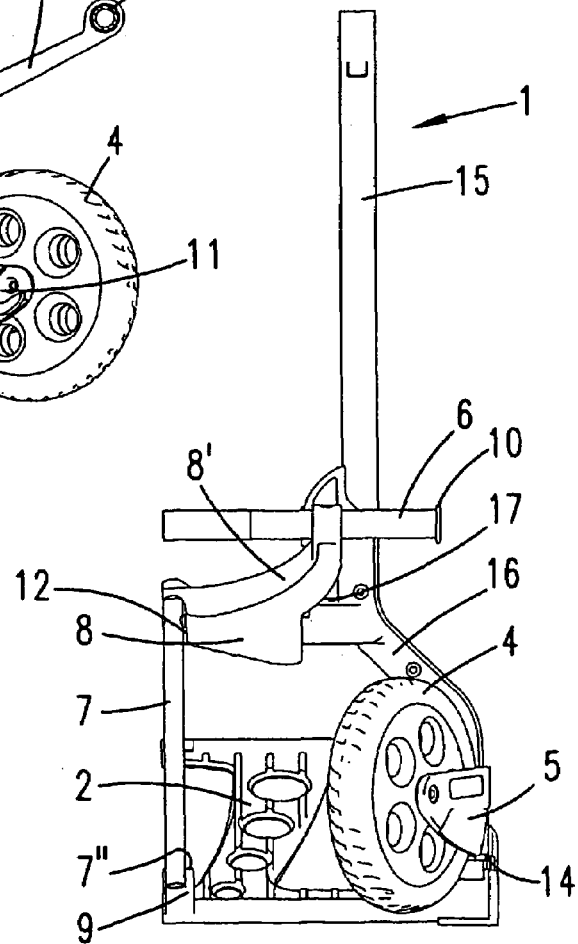

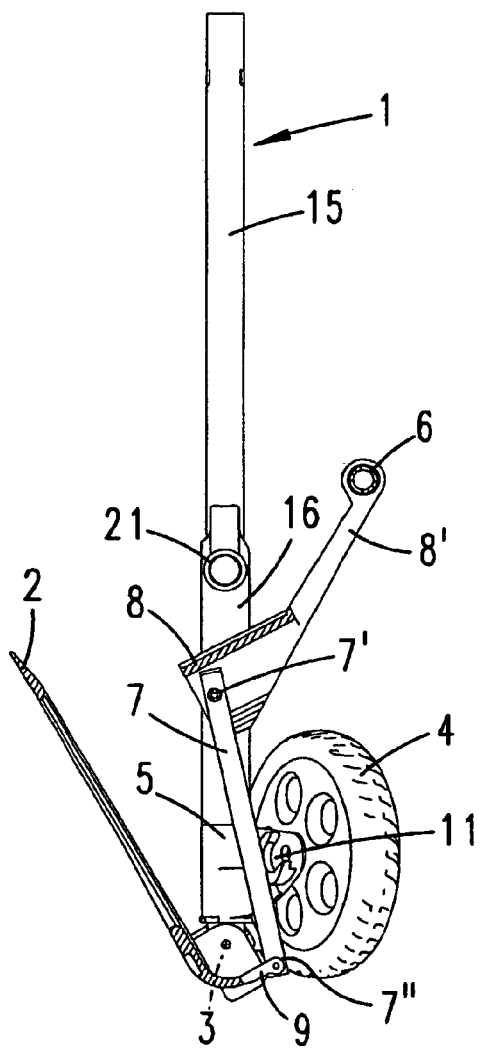
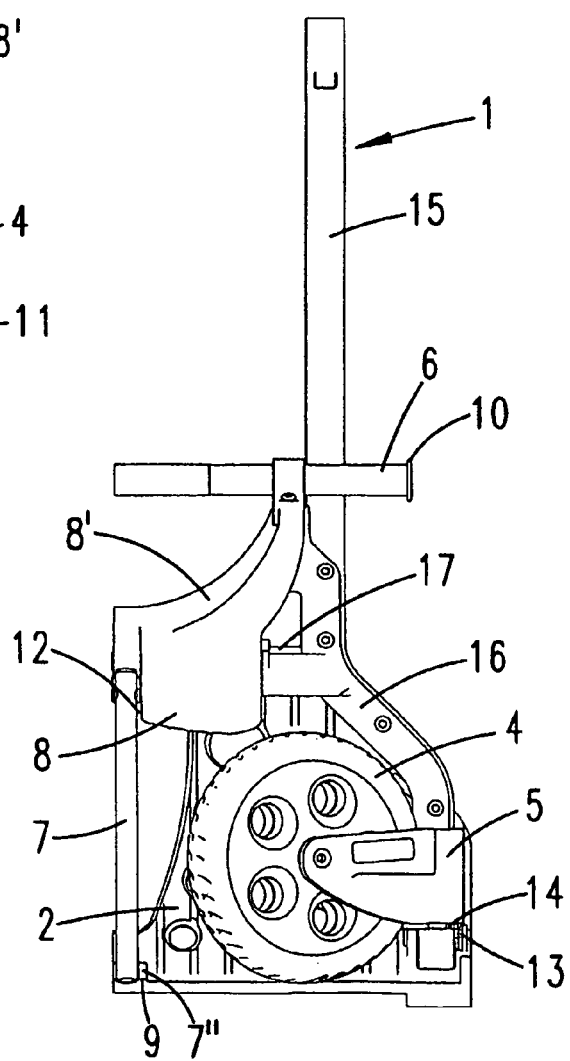

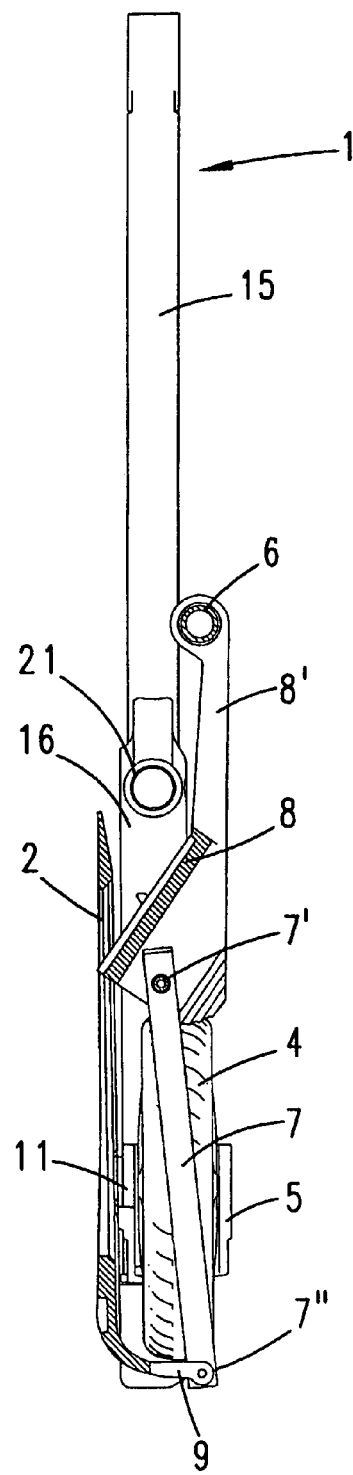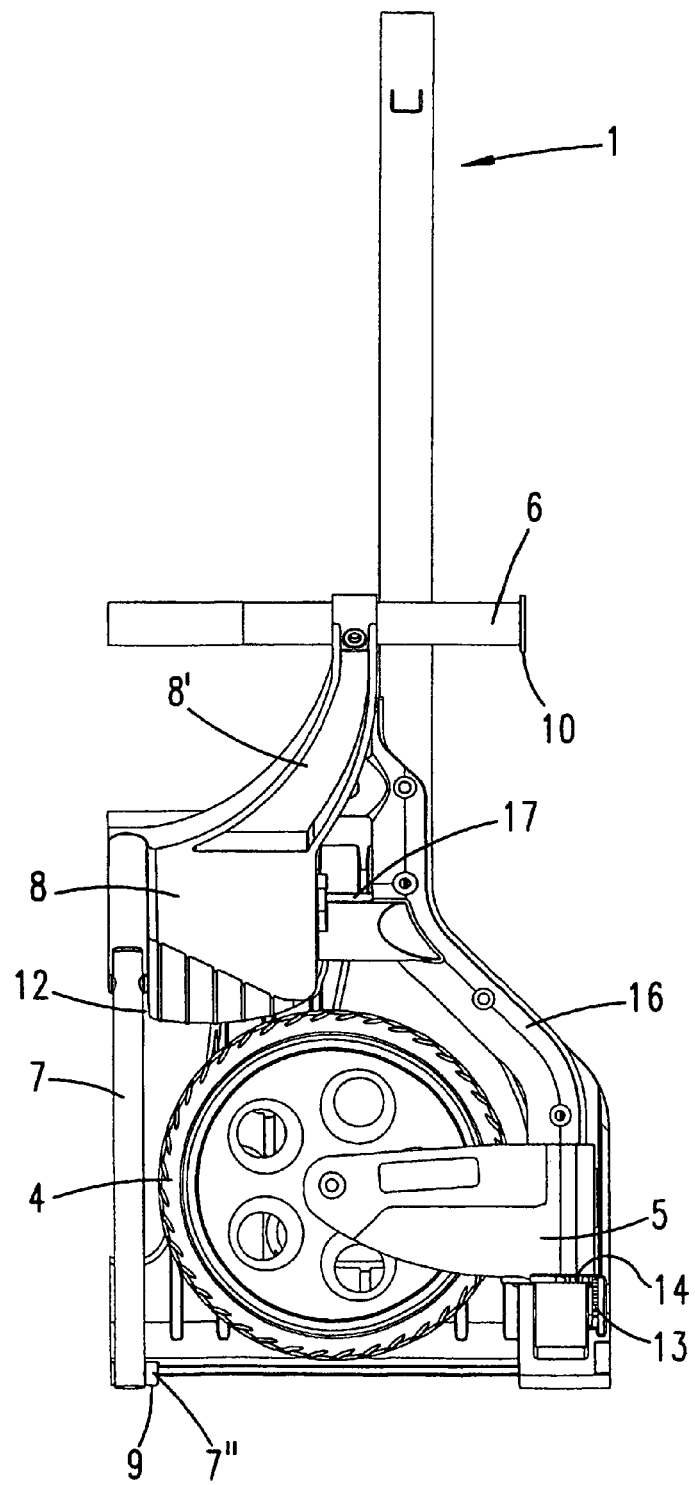

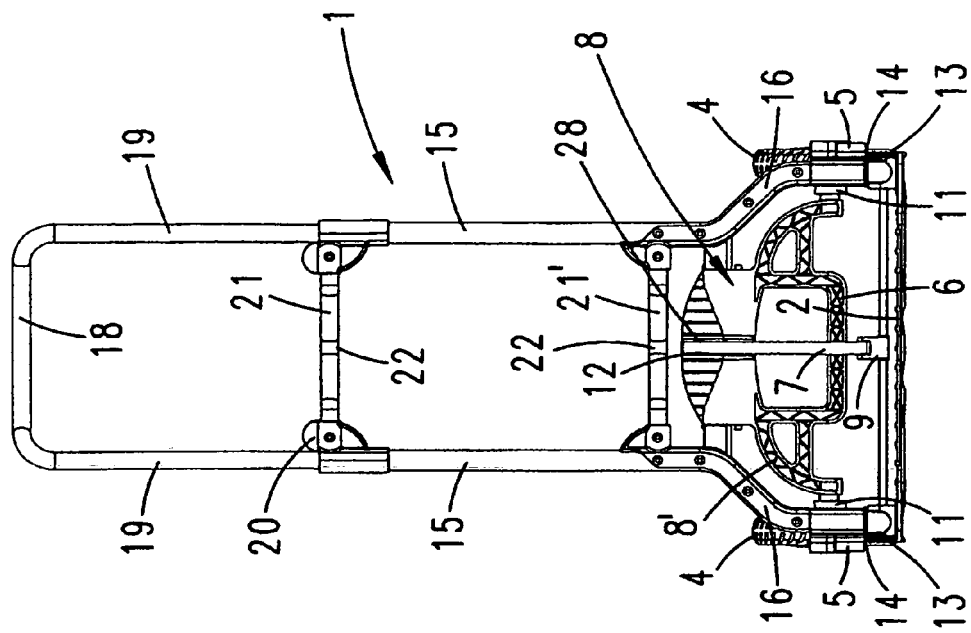
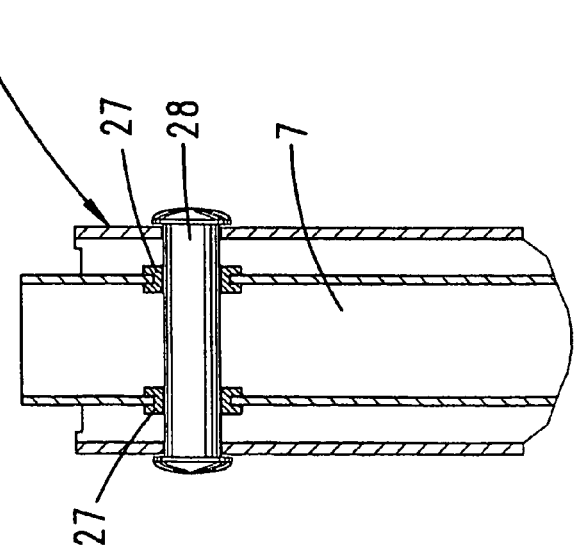

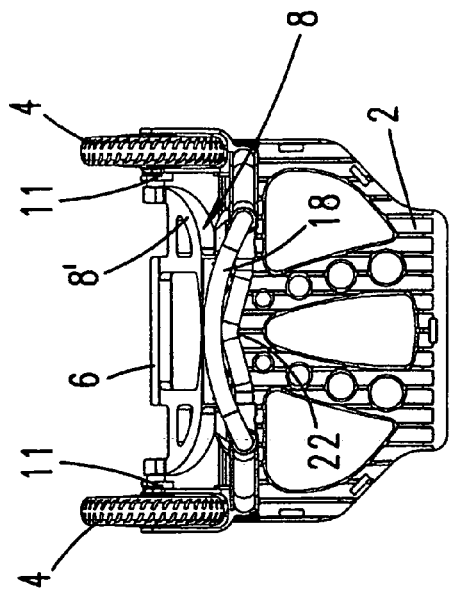
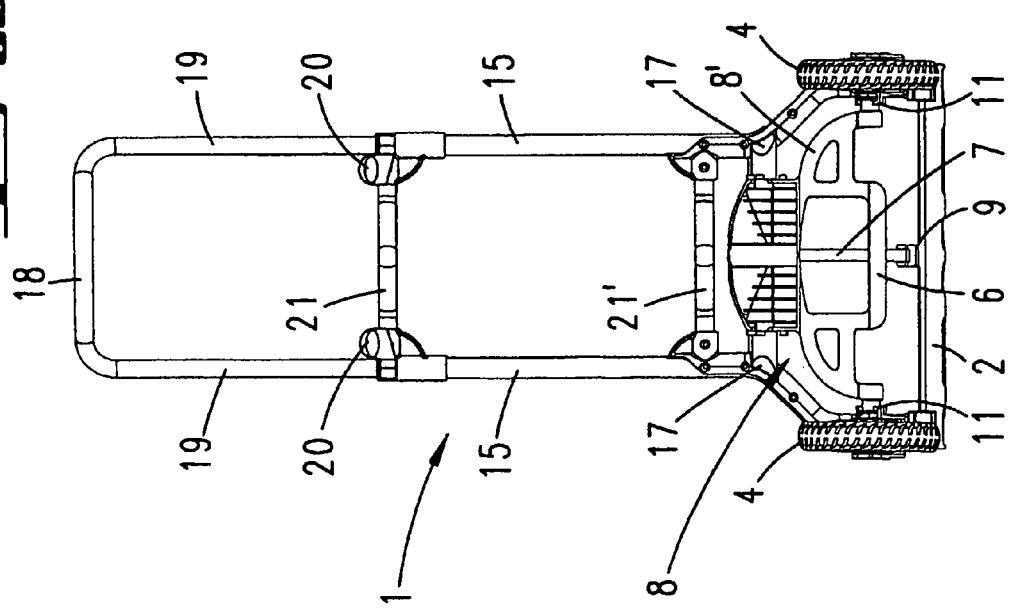

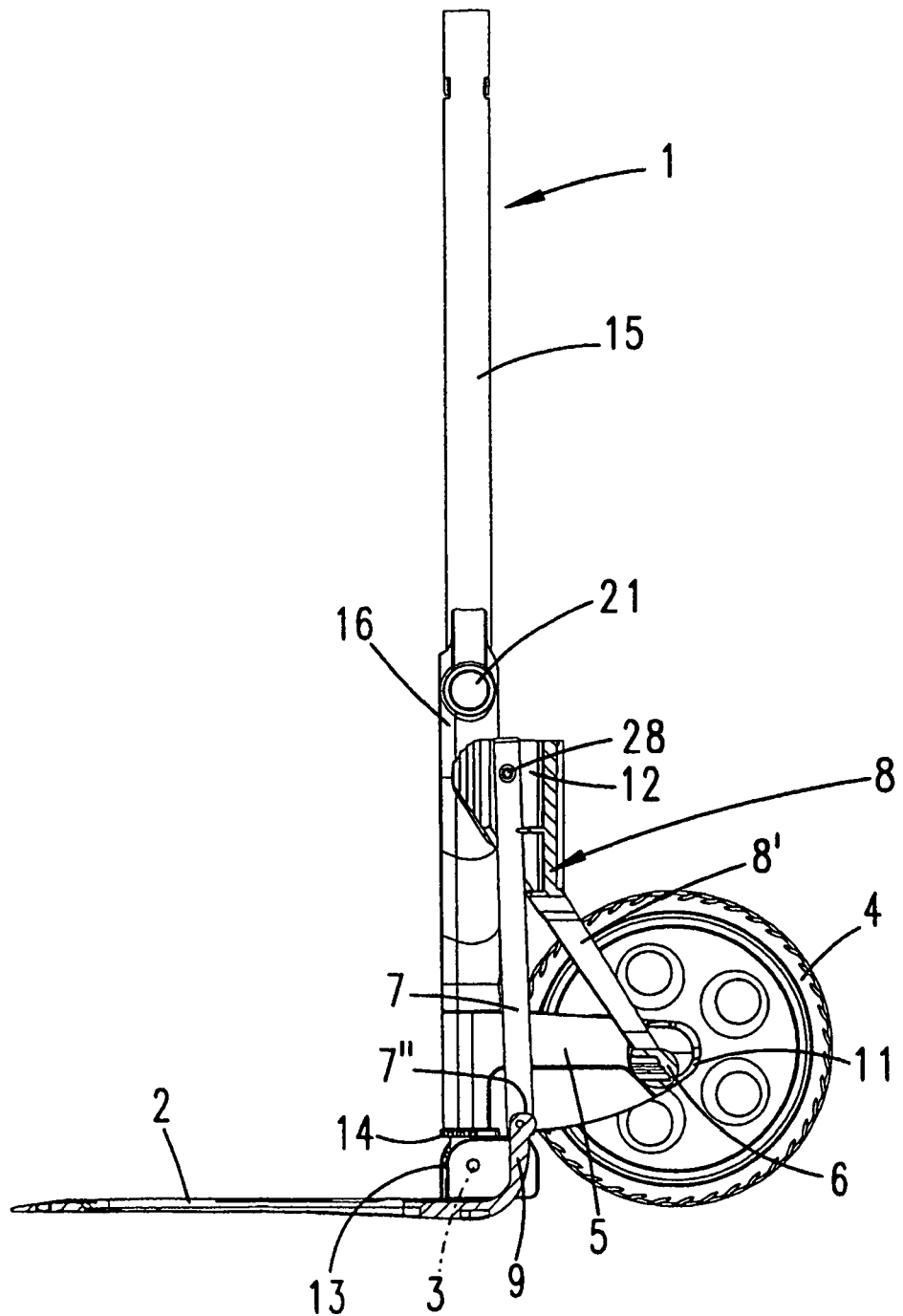

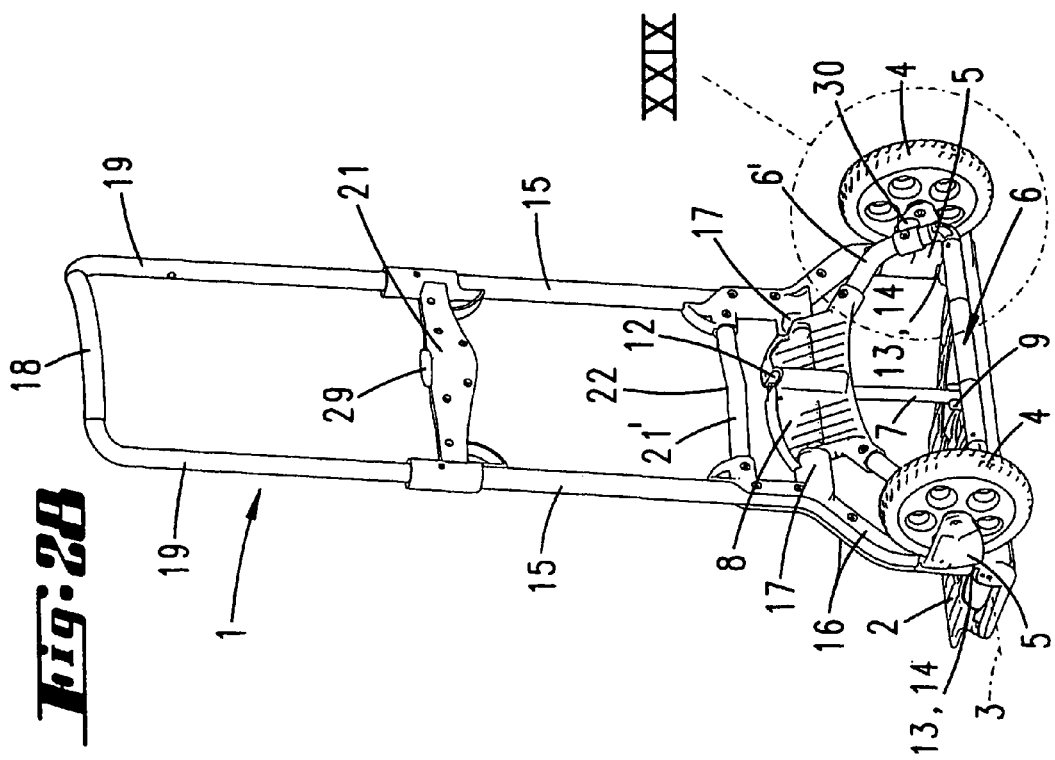

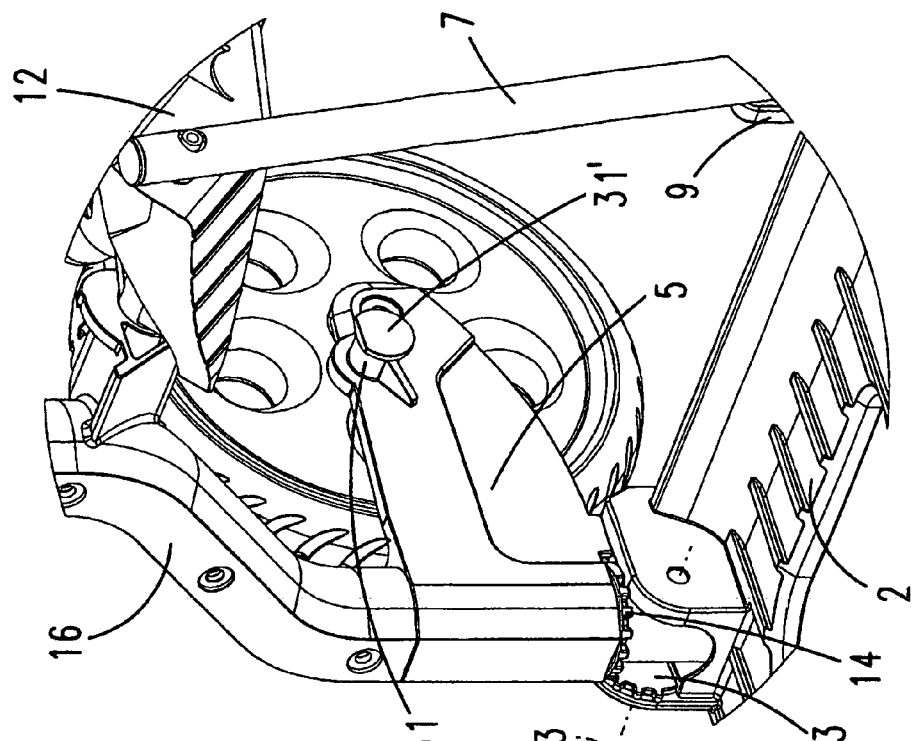
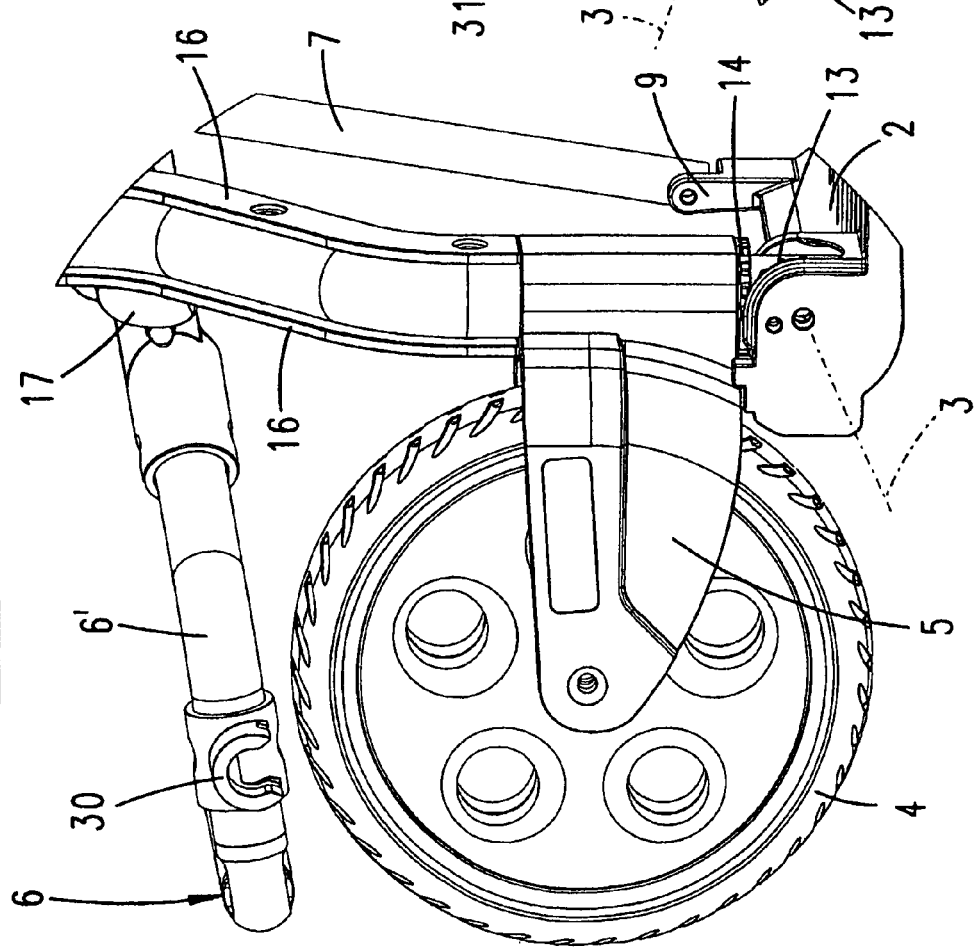

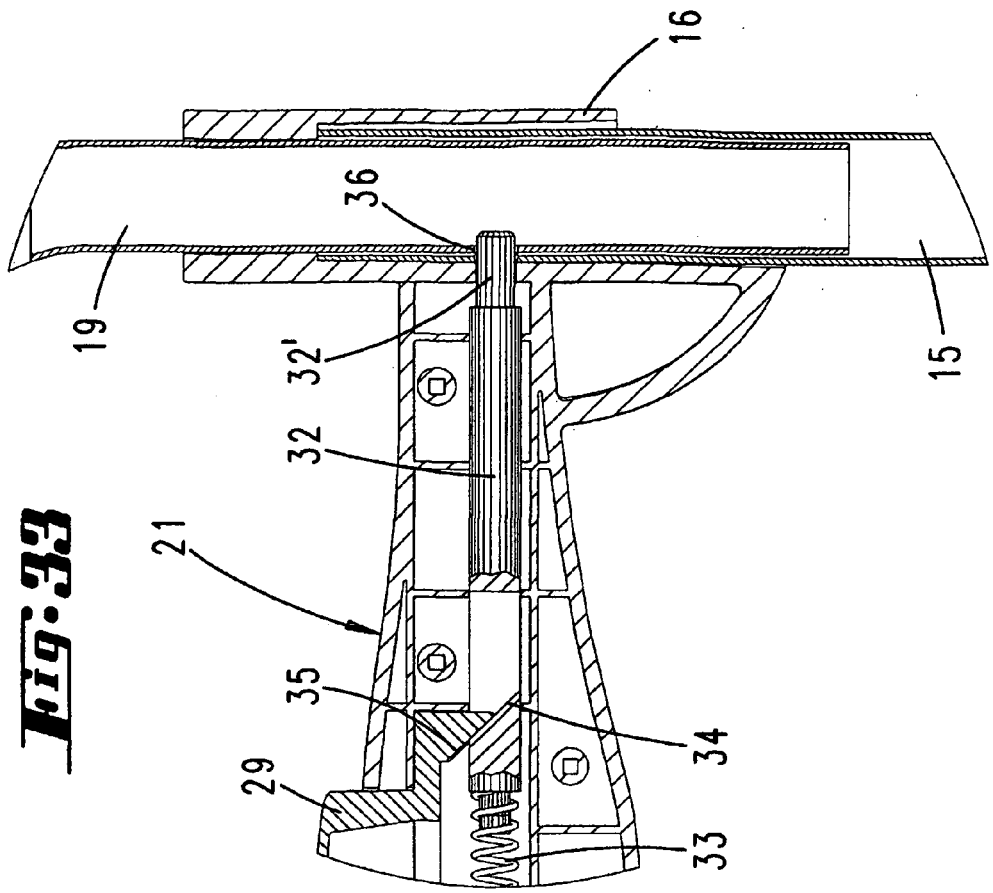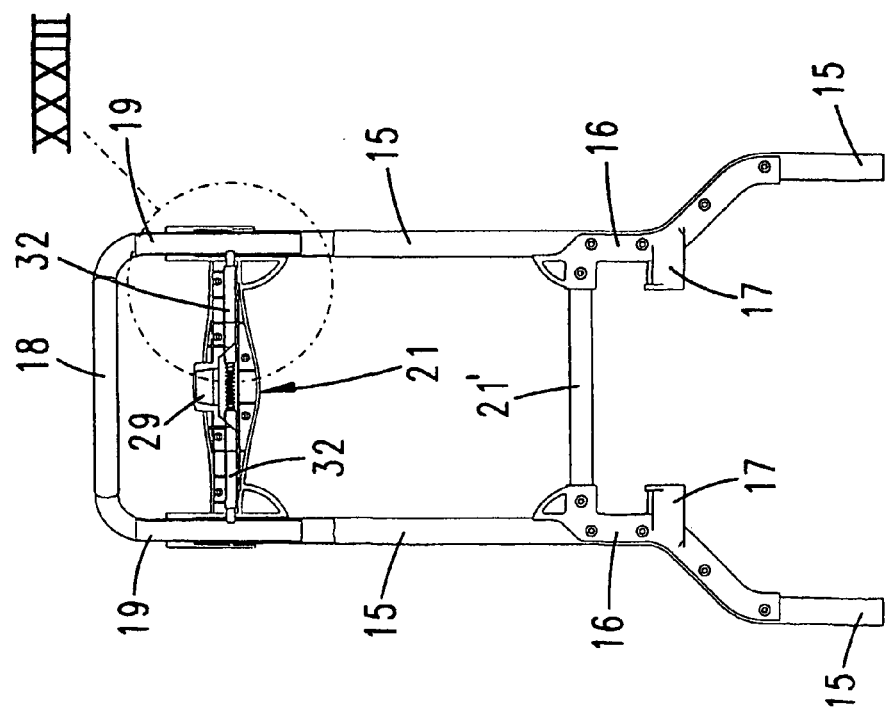

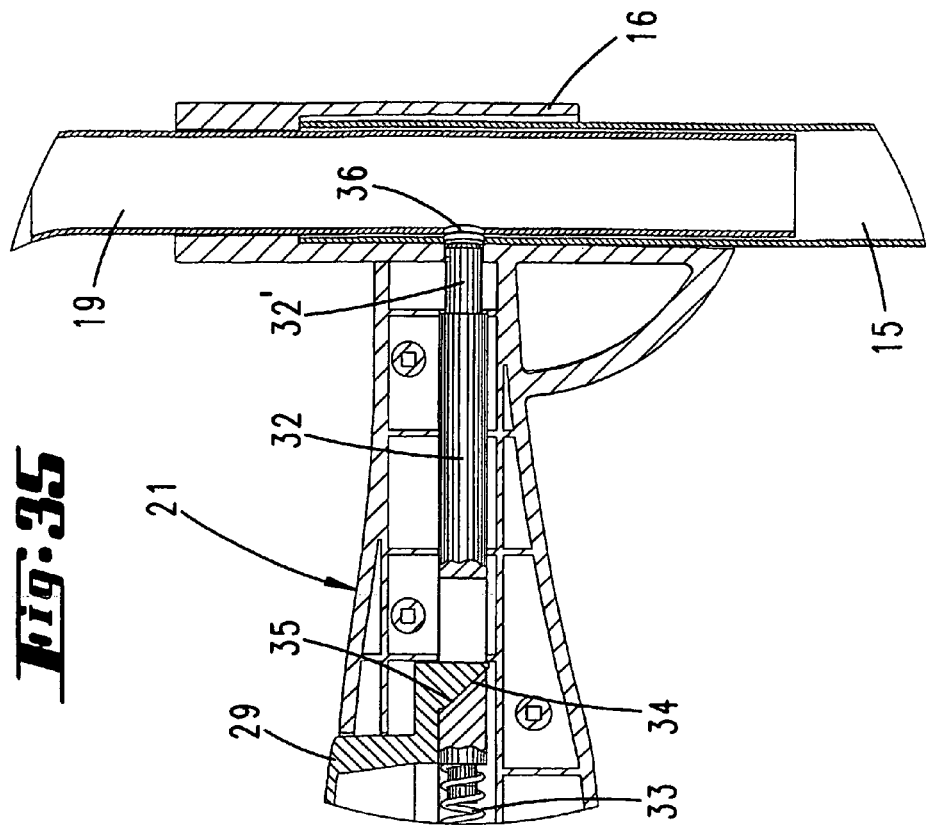
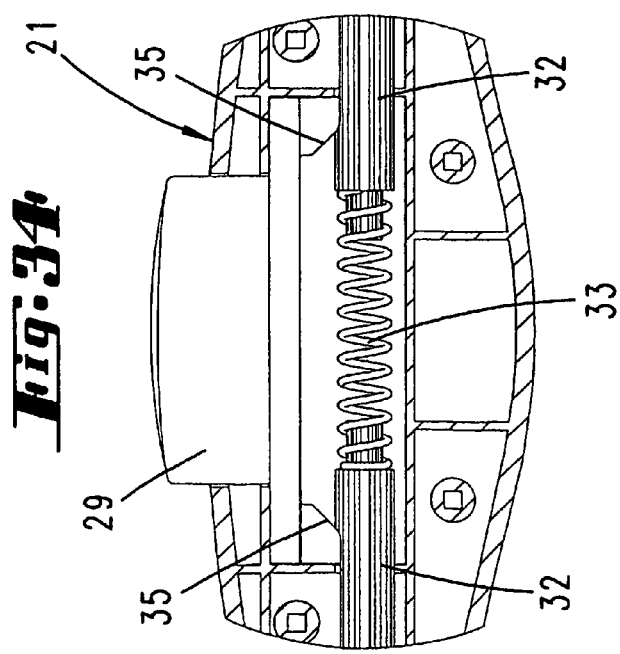

DOLLY

CROSS REFERENCES TO RELATED APPLICATIONS

The present application claims priority of German patent application no. 10204439.2 filed on Jan. 29, 2002, German patent application no. 10223459.0 filed on May 27, 2002, German patent application no. 10260719.2 filed on Dec. 23, 2002, and International application No. PCT/EP03/00321 filed on Jan. 15, 2003, the entire disclosures of which are incorporated herein by reference.

BACKGROUND OF THE INVENTION

The invention relates to a transport system or dolly. In an embodiment, the invention relates to a dolly with a carrying frame, at one end of which is articulated a scoop which can be pivoted about a pivot axis and is coupled for movement, via a gear mechanism, to two wheel carriers, which can each be pivoted about a bearing axis extending transversely to the pivot axis of the scoop and carry running wheels, such that, during pivoting of the scoop, the wheel carriers pivot out of a storage position, in which they are oriented parallel to the carrying arm, into a use position, which is directed transversely to the storage position and in which they are oriented parallel to one another.

A dolly is disclosed in U.S. Pat. No. 5,803,471. When, in the case of this dolly, the scoop is pivoted out of the use position, which corresponds to a horizontal position, into the not-in-use position, which corresponds to a vertical position of the scoop, then wheel carriers, which can be pivoted about a bearing axis extending transversely to the pivot axis of the scoop and which each carry a running wheel, are likewise pivoted into a position in which they are parallel to the carrying frame. The coupling for movement between the wheel carriers and the scoop axis is a radial toothing formation which is formed by interengaging pins. In the use position, a load can be placed on the scoop. The end of the carrying frame which is located vertically in the use position forms a height-adjustable handgrip. The wheels project rearwards in the use position, so that the load is raised by virtue of the carrying frame being tilted. The dolly can then be displaced via the wheels. In the not-in-use position, the wheels are located in a plane parallel to the carrying frame.

U.S. Pat. No. 3,788,659 likewise discloses a dolly in which the scoop and two wheel carriers can be moved into a position in which they are parallel to the carrying frame.

This adjustment which facilitates storage of the dolly in the not-in-use position can also be carried out for the dolly disclosed in EP 0 688 711 A2. In the case of that dolly, two wheel carriers, which can be pivoted about their bearing axes independently of the scoop, are fixed in the use position by means of a tie rod which can be pivoted parallel to the scoop axis.

U.S. Pat. No. 5,468,055 discloses a dolly in which the wheel carriers are likewise coupled to the scoop by means of a toothing formation. The handgrip is height-adjustable.

A similar type of dolly is disclosed in U.S. Pat. No. 3,659, 867. That document discloses a pivotable bracket which is coupled to the scoop such that, when the bracket is pivoted, the scoop swings out. It is necessary for the wheel carriers to be pivoted separately out of the storage position into the use position. However, the bracket makes it possible for the wheel carriers to be connected to one another in a stabilizing manner.

SUMMARY OF THE INVENTION

It can be an advantage in embodiments of the present invention for the dolly described in the introduction to be developed in a functionally advantageous manner.

In embodiments of the present invention, a dolly may have one or more of the following features, including an actuating handle which can be pivoted about an axis parallel to the scoop axis and is coupled for movement to the scoop by a connecting rod, the wheel carriers pivoting out of their storage position into their use position when the handle is pivoted from a not-in-use position into an intermediate position. The connecting rod is subjected to stressing when the handle is pivoted further into the end position, in which the handle fixes the two wheel carriers against pivoting. According to embodiments of the invention, the actuating handle is capable not just of pivoting along from the not-in-use position into the use position when the scoop is pivoted. It also pivots the scoop when it is pivoted back into the not-in-use position. Furthermore, just one handgrip pivots the scoop into the use position and also pivots the two wheel carriers out of their storage position. In the use position, the actuating handle also serves as a tie rod in order to fix the position of the two wheel carriers. The actuating handle pivots the scoop, and the wheel carriers which are coupled for movement thereto, via a connecting rod. The tie rod is preferably seated at the end of a power arm of a two-armed lever. The load arm of this lever acts on a connecting rod, which can be displaced approximately in the carrying-frame plane. This connecting rod is articulated on an actuating extension of the scoop. If the two-armed lever is displaced by action on the tie rod, then the connecting rod is also displaced. The connecting rod displaces the scoop by acting on the actuating extension of the scoop. When the handle is displaced from a pivoting position which corresponds to the use position into a position which corresponds to the not-in-use position, the connecting rod is preferably displaced over a dead center. Before reaching the dead-center position, the handle lever pivoted from the not-in-use position into the use position reaches a clamping position. This clamping position preferably corresponds to a handle pivoting position in which the tie rod is located outside the pivoting space of the running wheels. Following the clamping position, the handle is displaced further such that the tie rod pivots into the pivoting space of the two running wheels. The handle, in the dead-center position, may be located between the two wheels or outside the interspace of the two wheels. As a result of this configuration, starting from the use position, the tie rod is pivoted, in the first instance, in an idling manner, during which neither the scoop nor the wheel carriers pivot. Pivoting of the wheel carriers only commences when the dead-center position has been overcome and the tie rod is located outside the pivoting space of the running wheels. The running wheels are thus pivoted with something of a time delay. The two points of articulation of the connecting rod may also be associated with one another such that they can have their spacing changed elastically. For this purpose, the connecting rod may itself be elastic. Provision is also made, however, for the connecting rod to comprise a tube and for a spring element to be located within the tube and for an articulation of the connecting rod to be disposed such that it can be displaced elastically in relation to the tube. As a result of this configuration, the tie rod, in the use position, is retained, as it were, by the elastic force of the connecting rod in its position in which the wheel carriers are fixed at a spacing apart from one another. For fixing the tie rod in this position, it is also possible for the tie rod to be latched to the wheel carriers. For this purpose, the tie rod may have a collar, for example at each of its ends. This annular collar enters into an arcuate slot opening on the wheel carrier. The wheel carrier is thus arrested on the tie rod in the axial direction of the tie rod. The wheel carriers are thus even arrested with double action, namely, on the one hand, by the connecting rod fixed in its end position and, on the other hand, by the tie rod connecting the two wheel carriers rigidly to one another.

In an embodiment of the invention, it is provided that the lever which carries the tie rod is a two-armed plastics-material molding. This plastics-material molding may define a central groove which, in the use position, extends in the carrying-frame plane. This groove can accommodate the connecting rod. The wheel carriers may be coupled for movement to the scoop via radial toothing formations. The mounting of the lever which carries the tie rod, that is to say in particular the plastics-material molding, may be realized by means of shaped retaining parts. These shaped retaining parts may be U-shaped plastics-material claddings which partially enclose a portion of a tube of the carrying frame. The handgrip which is disposed opposite that end of the carrying frame which is associated with the scoop may be of height-adjustable configuration. For this purpose, the handgrip may be associated with a U-shaped tube which is guided such that it can be telescoped in the tubes forming the carrying frame. The handgrip can be fixed in the different height positions by means of eccentric clips.

The two tubes of the carrying frame may be connected to one another by a plurality of crossmembers. These crossmembers may define rearward convexities, so that it is easier to transport elongate articles.

In another embodiment of the invention, the handle is in the form of a D. The D-crosspiece forms the grip zone. Projecting from the D-arcs are latching projections, which can be moved into latching connection with the wheel carriers in order to fix the position thereof. It is possible for the latching projections to be formed substantially in a manner of half-tubes and to have a slot or an undercut, it being possible for a collar of a latching stub, which is fixed to the wheel carrier, to enter into the slot or the undercut. The latching projection may be connected as a clamping ring to the tubular D-arc. In an embodiment of the invention, it is provided that the handgrip formed by a U-shaped tube can be latched in the telescoped-in or telescoped-out position. For this purpose, a crossmember has two bolts which are forced in opposite directions by means of a spring and the heads of which can enter into latching cutouts of the tube. A button is used to retract the bolts. This button is disposed approximately centrally in the crossmember and has oblique flanks which interact with oblique flanks of the bolts.

Additional features and advantages of the present invention are described in, and will be apparent from, the following Detailed Description of the Invention and the figures.

BRIEF DESCRIPTION OF THE FIGURES

Exemplary embodiments of the invention are explained hereinbelow with reference to accompanying drawings, in which:

FIG. 12 shows an illustration according to FIG. 11 with the tie rod pivoted out of the latching position, FIG. 13 shows an enlarged partial illustration, in perspective, of the operating position according to FIG. 12, FIG. 14 shows a follow-up illustration to FIG. 12 in respect of movement, with the scoop pivoted slightly and the wheel carrier pivoted, FIG. 15 shows a rear view of FIG. 14, FIG. 17 shows a follow-up illustration to FIG. 14, FIG. 18 shows a rear view of FIG. 17, FIG. 19 shows a follow-up illustration to FIG. 17 in the fully pivoted-in, not-in-use position, FIG. 20 shows a rear view of the state according to FIG. 19, FIG. 23 shows an enlarged illustration of the elastic articulation of the connection rod on the arm of the handle, FIG. 24 shows a front view of a further exemplary embodiment of a dolly, FIG. 25 shows the rear view of the variant of the dolly according to FIG. 24, FIG. 26 shows a plan view of the variant of the dolly according to FIG. 24, FIG. 27 shows a sectional illustration according to FIG. 11 of the variant according to FIG. 24, FIG. 28 shows a perspective illustration from the rear of a further exemplary embodiment of the invention, FIG. 29 shows, from the viewing angle according to FIG. 28, the enlarged illustration of the detail XXIX, FIG. 30 shows a perspective lateral illustration according to FIG. 12 of the variant according to FIG. 28, FIG. 31 shows an enlarged partial illustration, in perspective, of the operating position according to FIG. 30, as seen obliquely from above, FIG. 32 shows the rear view of a carrying frame of the variant according to FIG. 28 with a crossmember covering removed, FIG. 33 shows an enlarged illustration of the detail illustrated by XXXIII in FIG. 32, FIG. 34 shows an enlarged illustration of the button, and FIG. 35 shows an illustration according to FIG. 33 with the bolt retracted.

DETAILED DESCRIPTION OF THE INVENTION

Figure 1:
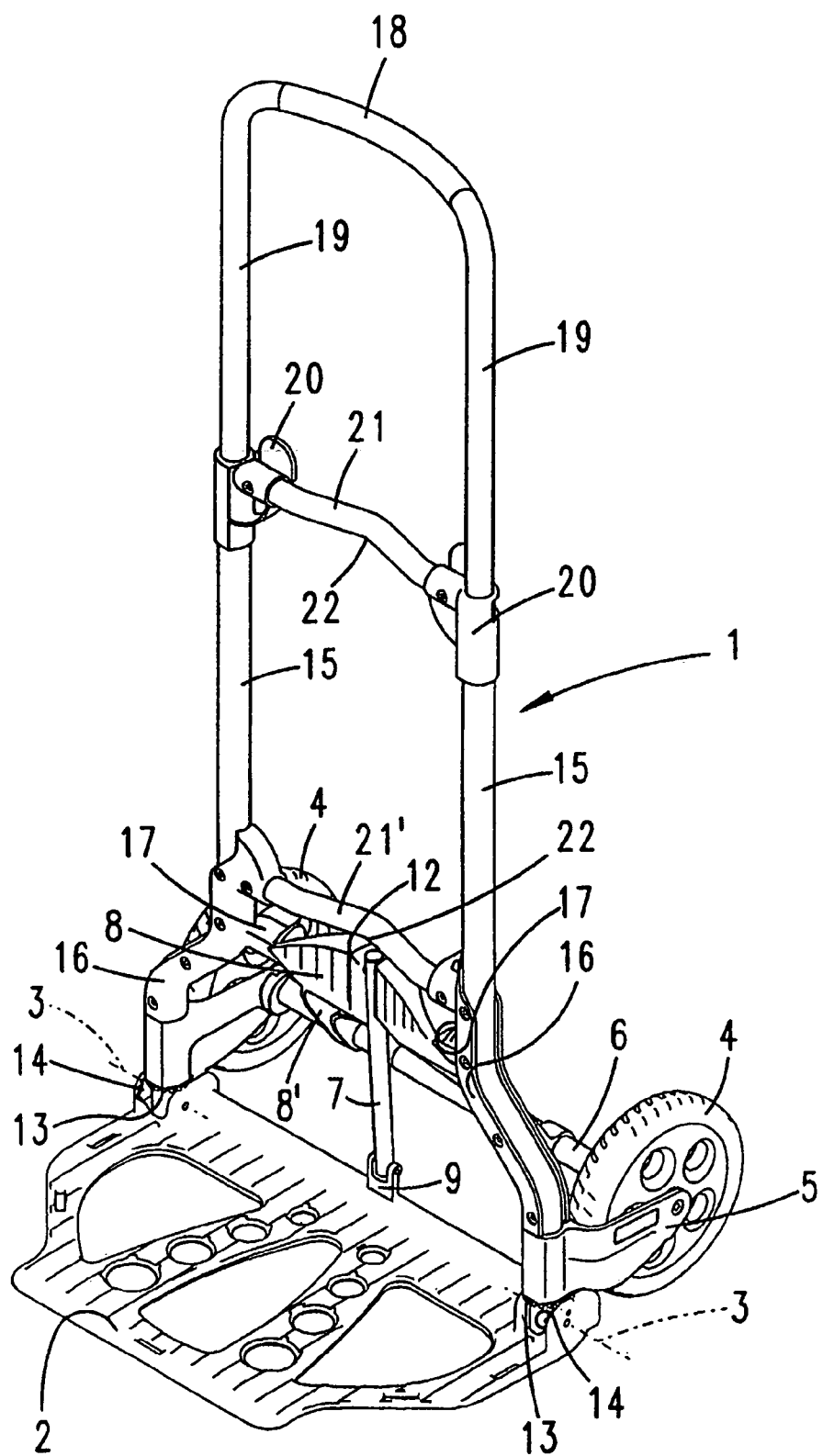
FIG. 1 shows a perspective illustration of a dolly in the use position.
Figure 2:
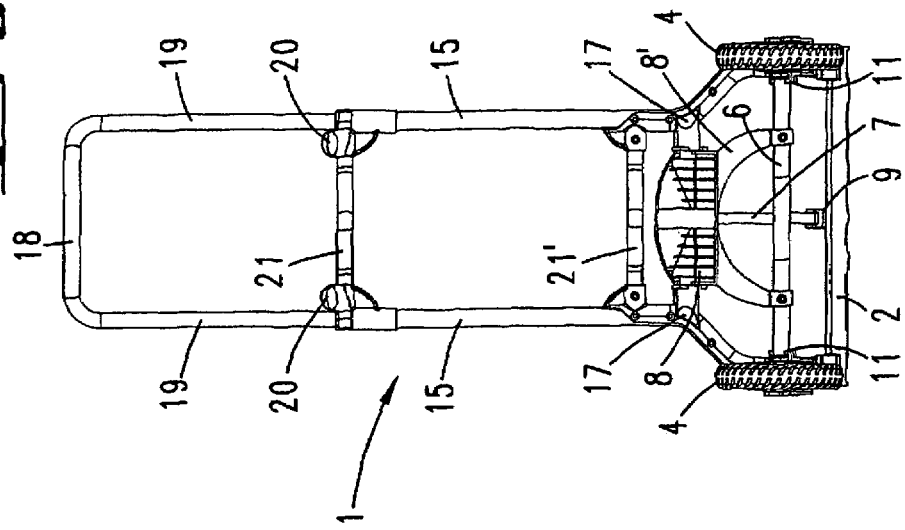
FIG. 2 shows the front view of the dolly.
Figure 3:
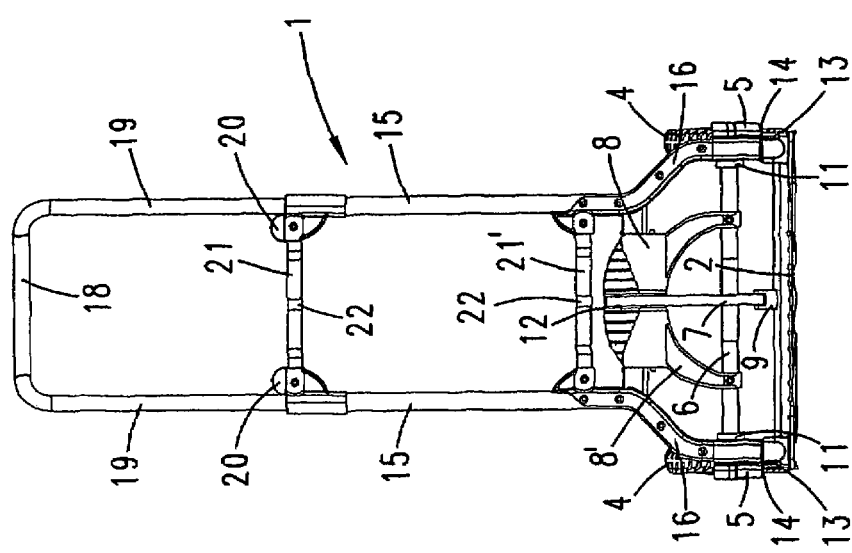
FIG. 3 shows the rear view of the dolly.
Figure 4:
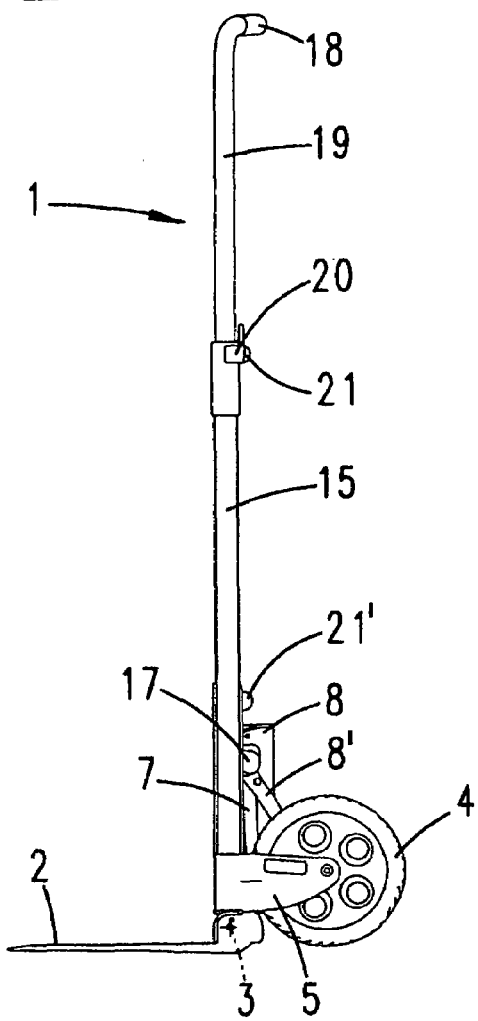
FIG. 4 shows the side view of the dolly.

The dolly illustrated in the drawings has a carrying frame 1 which comprises two substantially parallel tubes 15. The tubes 15 are connected at one end by a crossmember 21. The crossmember 21 is connected to the tube 15 by means of plastics-material connecting components, which simultaneously form eccentric clips 20 for a U-shaped tube 19 which is plugged into the tube 15. The U-crosspiece of the U-shaped tube 19 forms a handgrip 18. As a result of the telescoping capability, it is possible for the height position of the handgrip 18 to be adjusted and to be fixed in each height position as a result of the eccentric clips 20.

The spacing between the two, in the first instance, parallel extending tubes 15 increases in the downward direction. A crossmember 21' is also located here, and connects the two tubes 15 to one another. The crossmember 21' is connected to the tubes 15 by means of a shaped retaining part 16, which has a substantially S-shaped extent and is of U-shaped configuration in profile, in order to accommodate a portion of the tube 15. A wheel carrier 5 can be pivoted about the end portion of each tube 15. This wheel carrier 5, which consists of plastics material, has a fork which accommodates in each case one running wheel 4.

Figure 10:
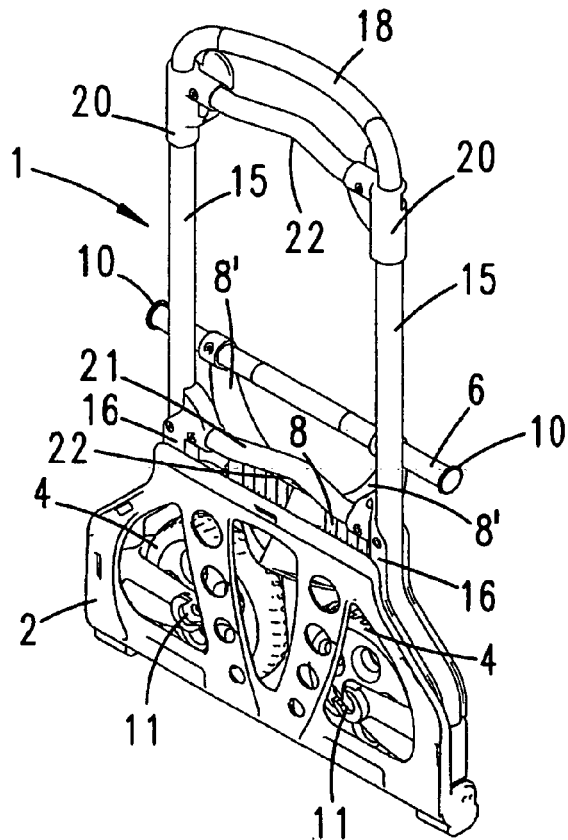
FIG. 10 shows a perspective illustration of the dolly in the not-in-use position, in which the scoop, the wheel carriers and the lever carrying the tie rod assume a position in which they are parallel to the carrying frame.
Figure 16:
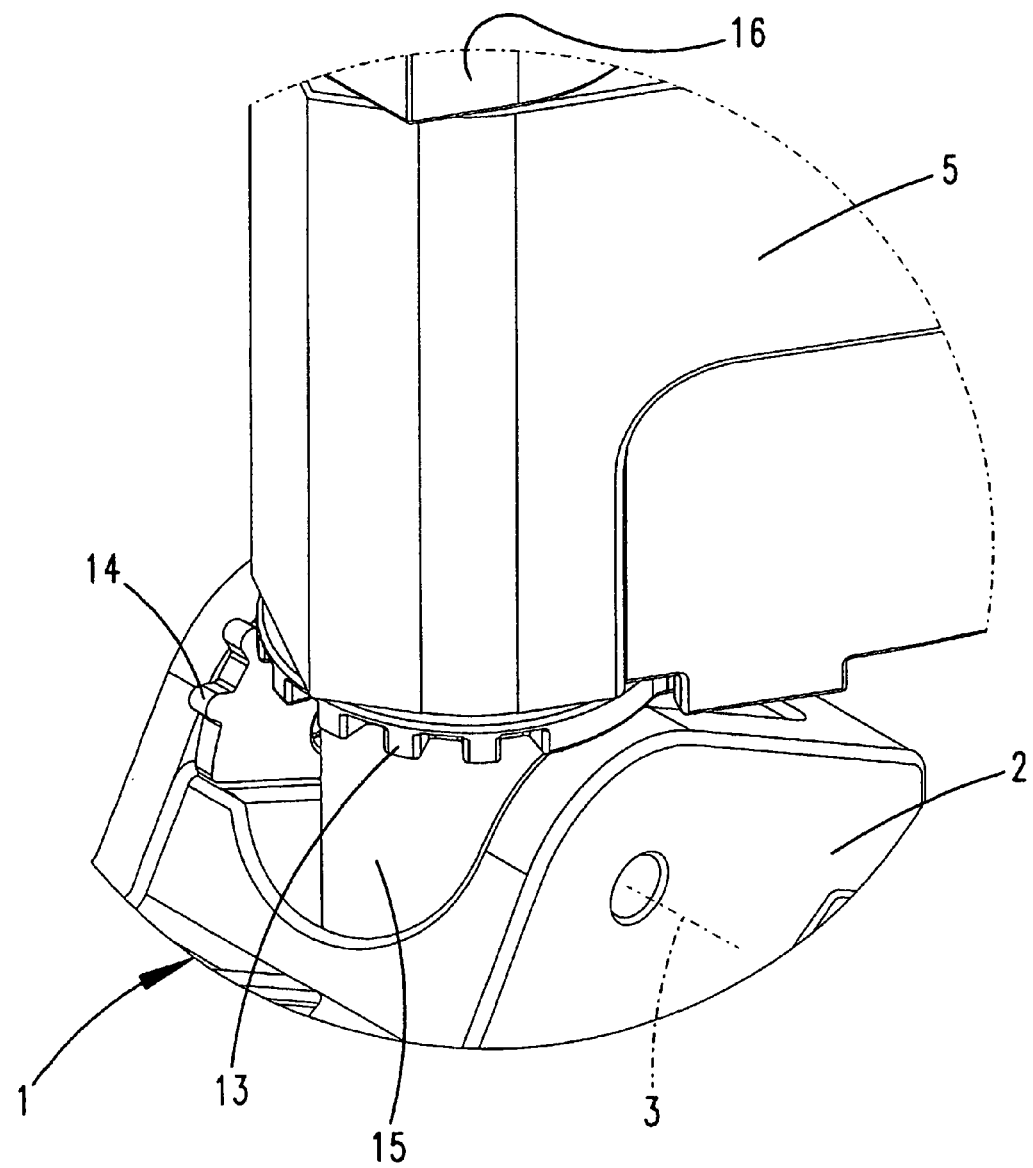
FIG. 16 shows an enlarged illustration of the toothing formation of the scoop toothingly engaging in the toothing formation of the wheel carrier in a functional position according to FIG. 14.

As can be seen from FIG. 16, the end face of the bearing flange of the wheel carrier 5 is provided with a toothing formation 13. Engaging in this toothing formation 13 is a toothing formation 14, which belongs to a scoop consisting of steel, aluminum or a plastics material. This scoop 2, which is of flat formation and in an exemplary embodiment has cut-outs, is articulated at the ends of the tubes 15. As a result of the toothing formations 13 and 14 engaging, the scoop 2 is coupled for movement to the wheel carriers 5. If the scoop is pivoted out of the use position, which is illustrated in FIG. 1, into the not-in-use position, which is illustrated in FIG. 10, then the wheel carriers 5 are pivoted along with it.

In the use position, which is illustrated in FIG. 1, however, pivoting of the scoop is not possible since, on the one hand, the wheel carriers 5 cannot pivot and, on the other hand, the connecting rod 7 is fixed in a dead-center position.

The connecting rod 7 is articulated, by way of its point of articulation 7", on an actuating extension 9 of the scoop, this actuating extension projecting to the rear beyond the pivot axis 3 of the scoop. The connecting rod 7 extends approximately in the carrying-frame plane and has its other articulating end 7' articulated on a lever 8.

The lever 8 is formed by a plastics-material molding which defines a central groove 12 in which, in the use position, the connecting rod 7 is positioned with favorable space conditions. By means of its two axial extensions, which define a lever pivot axis which is parallel in space to the pivot axis 3 of the scoop, the lever 8 is mounted in a pivotable manner in pivot bearings 17, which are formed by the shaped retaining part 16. The lever 8 is two-armed. The load arm of the lever 8 acts on the point of articulation 7' of the connecting rod 7. The power arm of the lever 8 is formed by two arms 8' of the plastics-material molding. These two arms 8', at the free end, form eyelets through which the tie rod 6 is plugged.

In the use position, the tie rod 6 connects the two inner fork legs of the wheel carriers 5 to one another. For fixing the tie rod on the wheel carriers 5, the fork flanks have arcuate slot openings which form a latching pocket 11. A collar 10 of the end of the tie rod 6 can be introduced into this latching pocket 11. In the use position, the axis, rather than being located along the axis of rotation of the running wheels, is offset in the direction of the pivot axis of the wheel carriers, that is to say between the axis of rotation of the running wheels and the pivot axis of the wheel carriers.

Figure 5:
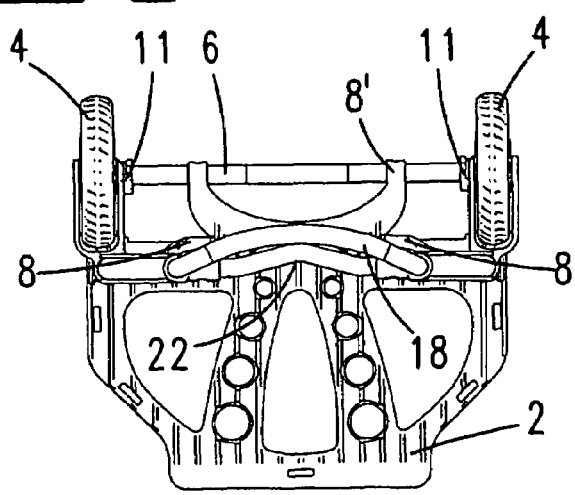
FIG. 5 shows the plan view of the dolly.
Figure 6:
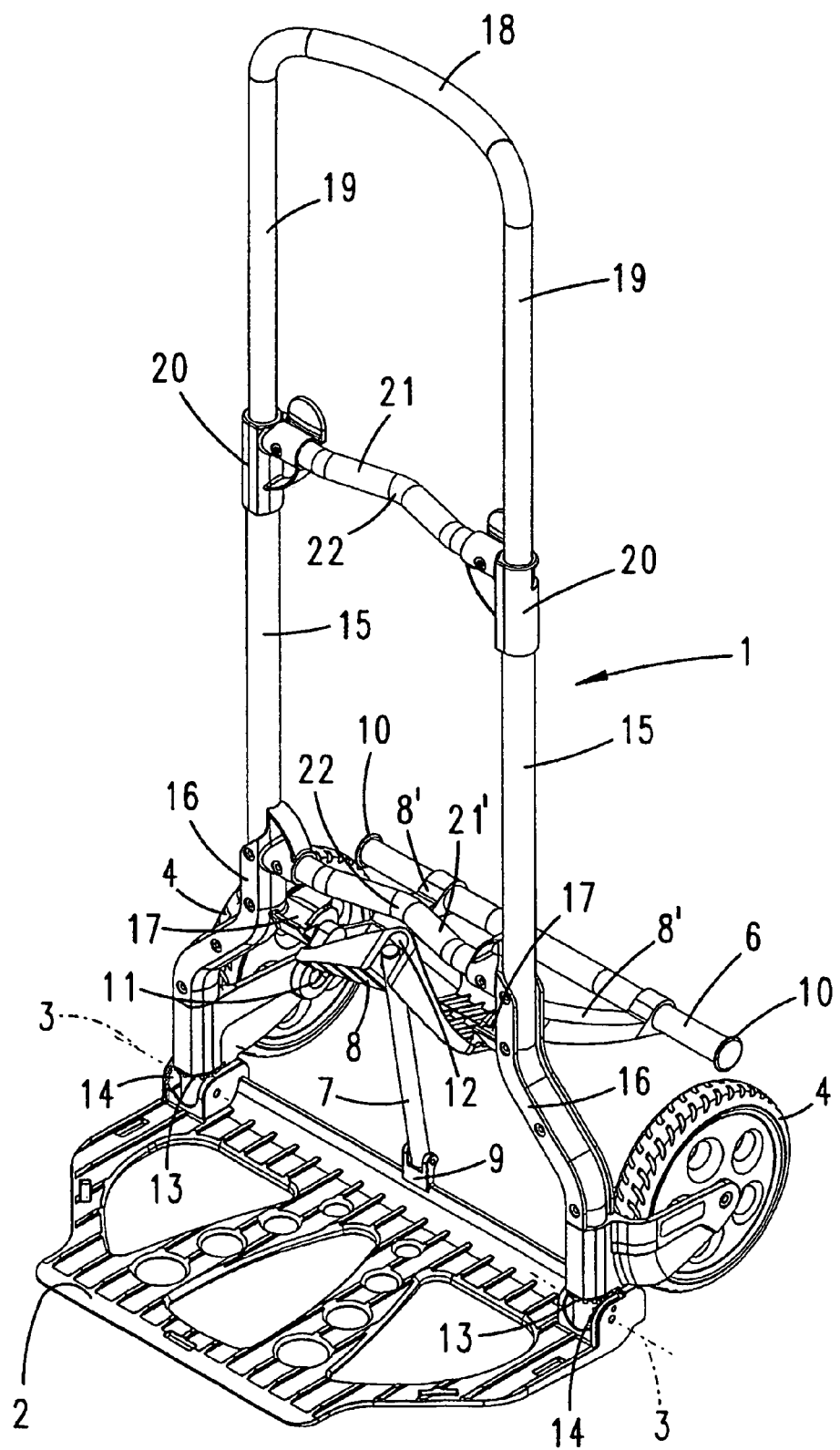
FIG. 6 shows the dolly in an illustration according to FIG. 1 with the tie rod released from its latching position, following passage beyond the dead-center position.
Figure 7:
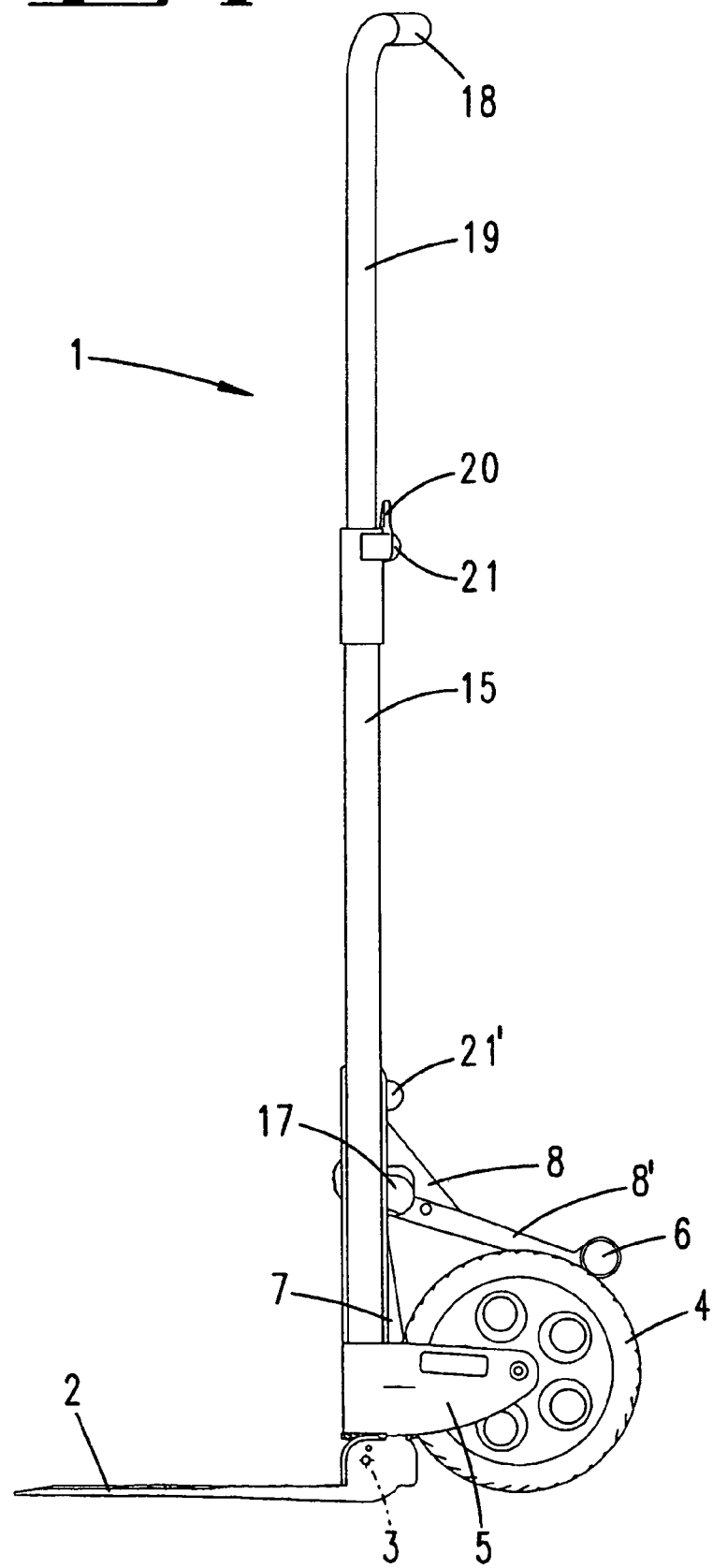
FIG. 7 shows an illustration in side view of the state according to FIG. 6.
Figure 8:
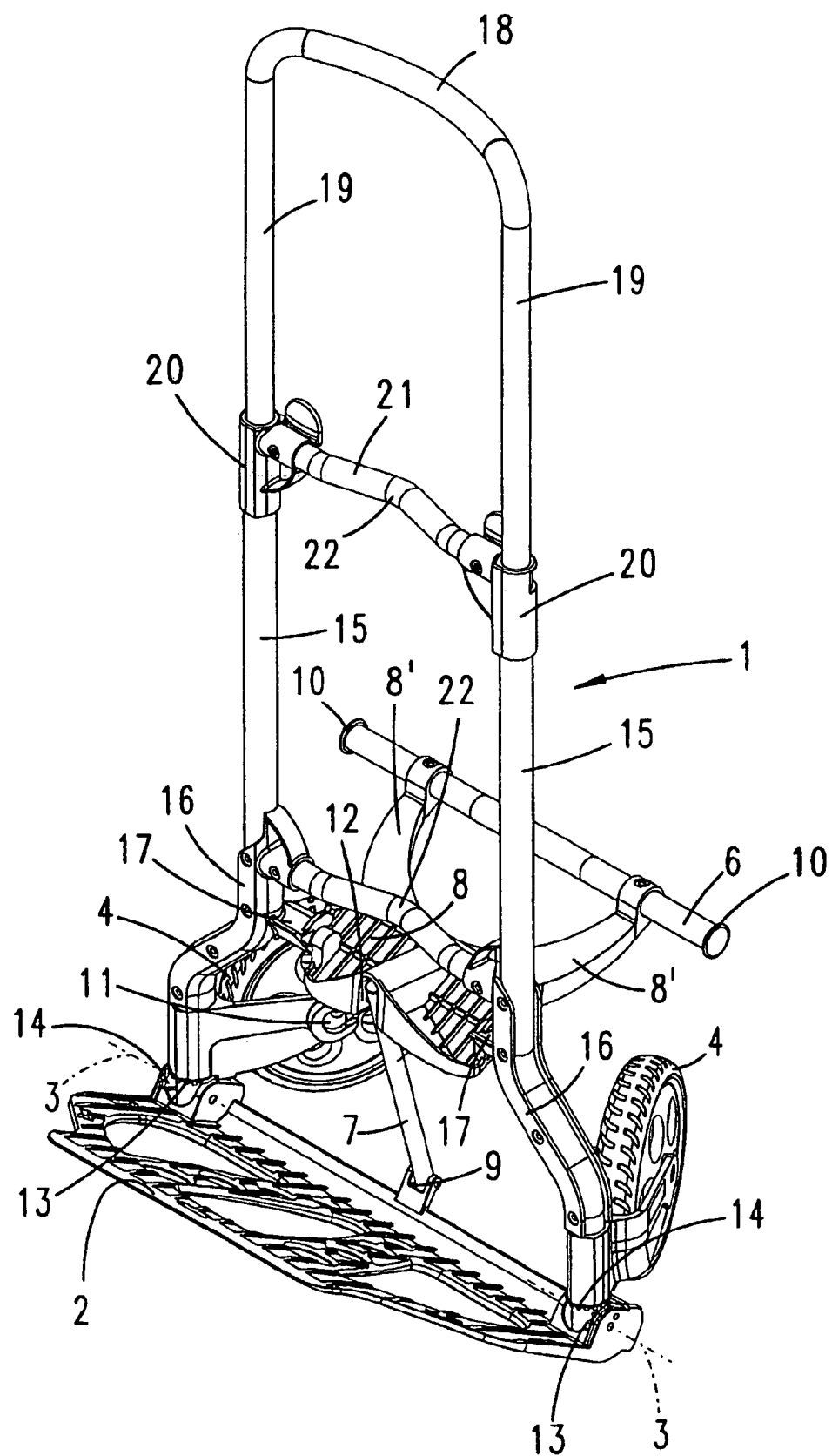
FIG. 8 shows a follow-up illustration to FIG. 7, in which the tie rod has been pivoted further and the scoop has been raised slightly and the wheel carriers have pivoted slightly.
Figure 9:
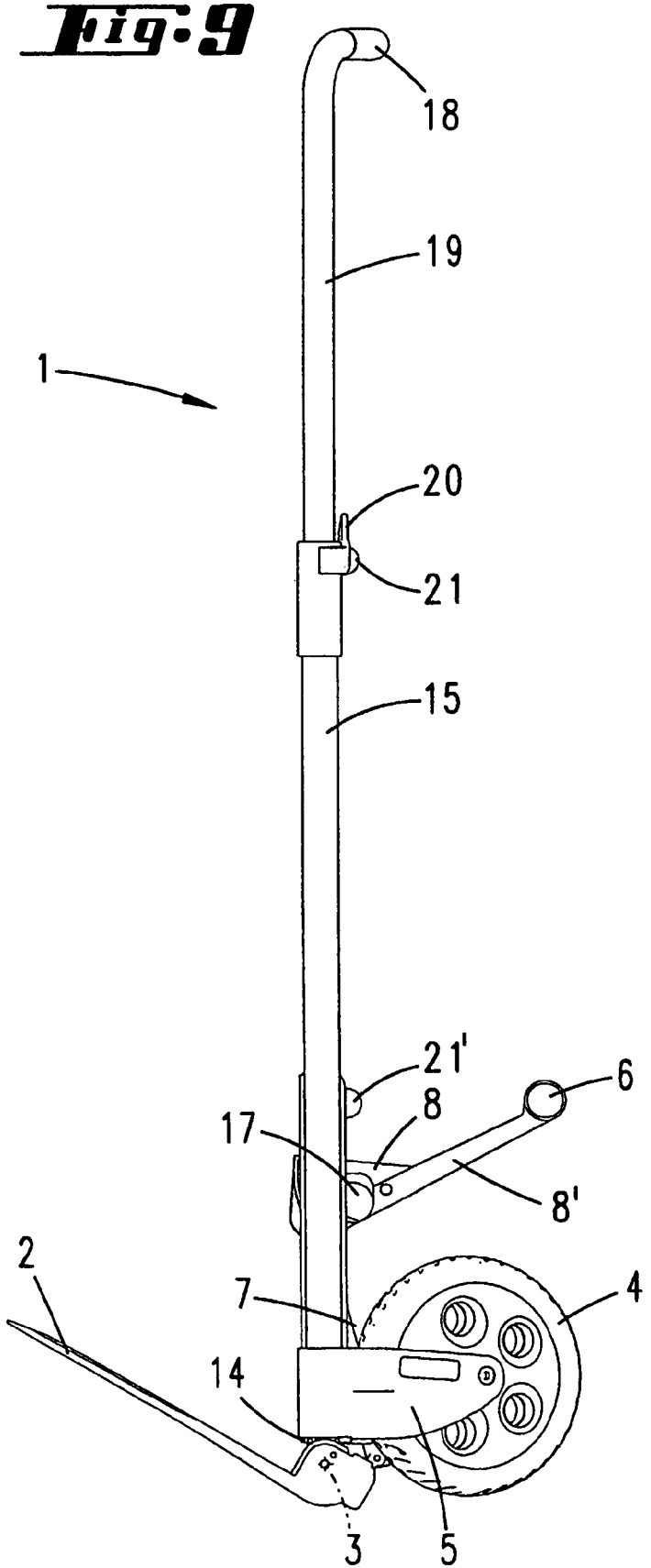
FIG. 9 shows a side view of the state according to FIG. 8.

The lever 8 has a rearward convexity. The crossmembers 21 and 21' have congruent convexities 22. It is also possible for the handgrip 18 to form such a convexity, so that a horizontally extending channel, which can be seen in FIG. 5, is produced overall, this making it easier to transport elongate and round articles.

As FIG. 23 in particular shows, the connecting rod is formed by a hollow cross-sectionally circular tube. A pin 28, for example made of steel, which may carry a rivet cap on both ends passes through the connecting rod 7. This pin connects the connecting rod 7 to the lever 8. In order to achieve elastic coupling of the connecting rod 7 to the lever 8, the aligned openings of the connecting rod 7, which has the pin 28 engaging through them, have elastic linings which can deform under loading. It is thus possible for the pin 28 to be able to move within the openings. The restoring force produced by the elastic linings 27 is increased during the over-dead-center displacement when the handle is pivoted from the intermediate position into the end position.

The dolly also functions as follows.

Figure 11:
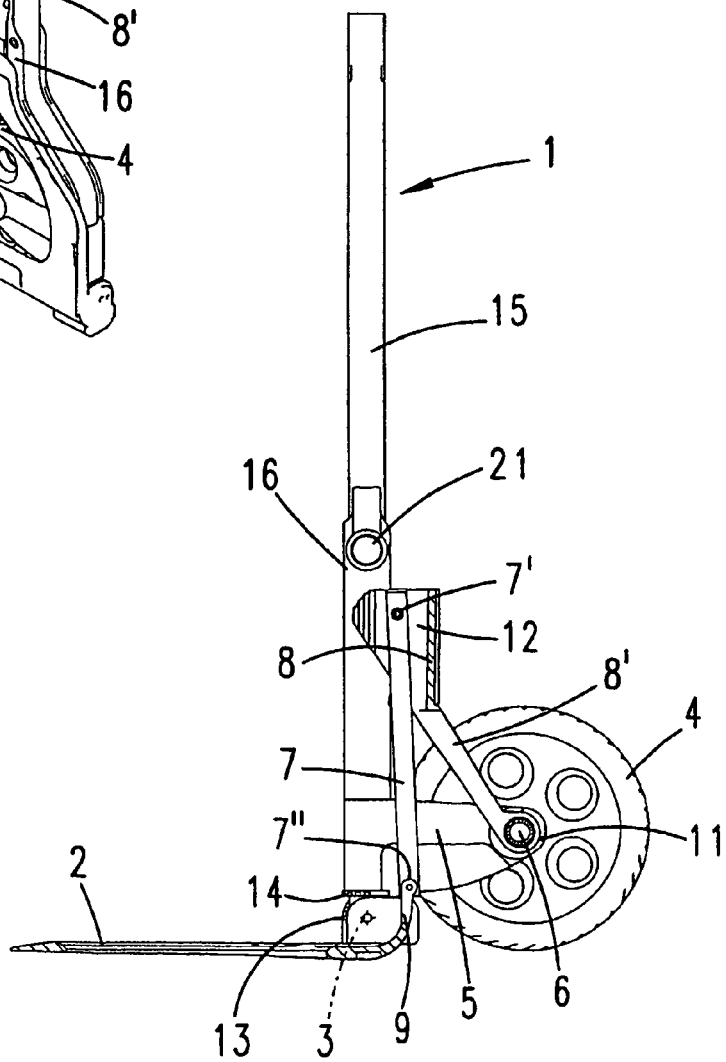
FIG. 11 shows an illustration according to FIG. 4, in enlarged detail form and with the wheel carriers broken away, with a direct plan view of the connecting rod and its points of articulation.

FIG. 11 illustrates the use position, in which the collars 10 of the tie rod 6 are positioned in the associated pockets 11, so that the position of the wheel carriers 5 is fixed. In this position, the connecting rod 7 may be subjected to tensile loading. For this purpose, the two points of articulation 7', 7" can preferably be moved elastically away from one another. This may be realized by an elastic element, for example a spring, disposed within the connecting rod. The scoop 2 is thus drawn into its pivoting end position.

If action on the tie rod 6, as a result of which the latter is utilized as a handgrip, causes the tie rod to be lifted out of the latching position, then the lever 8 in the illustration according to FIG. 11 pivots in the anticlockwise direction. In this case, the point of articulation 7' is raised slightly until the dead-center position, which is illustrated in FIG. 12, is reached. As a result of this dead-center position, in the functional position according to FIG. 11, the tie rod 6 is retained in the latching position and by the tensile stressing applied by the connecting rod.

The dead-center position is overcome when the tie rod 6 has left the pivoting space of the running wheels 4. If the tie rod is then pivoted further in the direction of the operating position illustrated in FIGS. 14 to 16, then the wheel carriers 5 and the scoop 2 begin to pivot about the respective pivot axis. This pivoting continues, beyond the operating position which is illustrated in FIGS. 17 and 18, into the not-in-use position, which is illustrated in FIGS. 19 and 20 and in which the wheels and the scoop are located parallel to the carrying frame.

Figure 21:
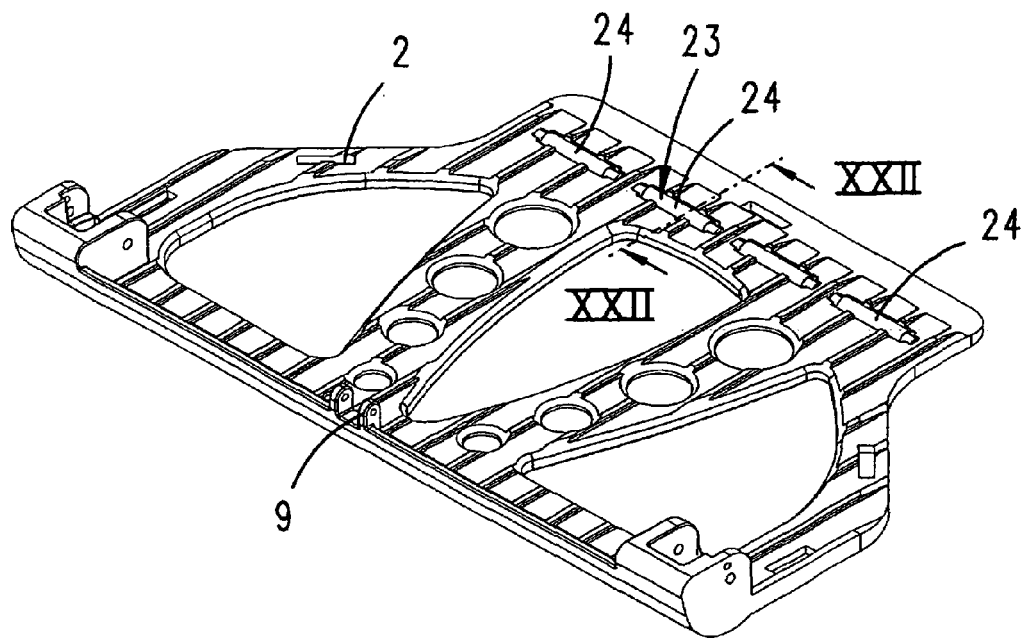
FIG. 21 shows a second embodiment of the scoop.
Figure 22:
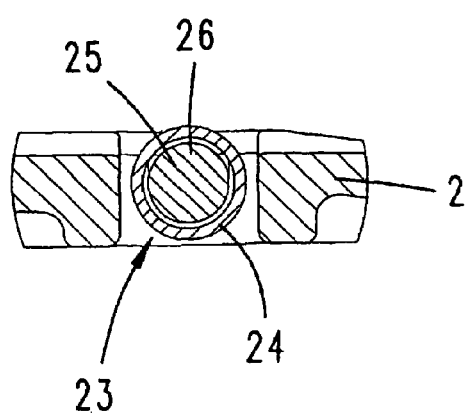
FIG. 22 shows the section along line XXII-XXII in an enlarged illustration in the region of the roller.

FIGS. 21 and 22 show a modified scoop. Located in the region of the front edge of the scoop 2 are rollers 23, the axes of which are aligned with one another and run parallel to the pivot axis of the scoop. As can be gathered from FIG. 22, the rollers 23 have rolling sleeves 24 which are mounted in a rotatable manner about spindles 25. The rollers 23 are located in individual, slot-like cutouts of the scoop 2 and are fixed there by means of fastening screws 26. The fastening screws 26 project through the axial body 25 obliquely in relation to the axis. This allows installation from the top side or the underside of the scoop.

The exemplary embodiment which is illustrated in FIGS. 24 to 27 substantially corresponds to the first exemplary embodiment, the exception being that the handle 6 is configured differently. This handle, rather than having a continuous tie rod, comprises a unitary plastics-material part which forms peripheral brackets 8' to which are assigned the annular collars 10, which interact with the latching pockets 11. The annular collars 10 are seated on stub axles or projections which extend from the brackets 8'. The brackets are connected to a handgrip 6 by stabilizing transverse connections. This handgrip is located approximately centrally between the two brackets 8'. In relation to the imaginary axis of the two running wheels 4, the handle 6 is closer to the carrying frame, which results in a more stable construction.

The functioning of the second exemplary embodiment substantially corresponds to the functioning of the first exemplary embodiment. Starting from a storage position corresponding, for example, to FIG. 10, the handle 6 can be pivoted downwards. In this case, the scoop 2 and the two wheel carriers 5 are simultaneously pivoted through 90° into their use position. The use position is reached when the handle 6 has reached an intermediate position, as is illustrated, for example, in FIG. 12. If the handle is pivoted further out of this intermediate position, then the rubber inserts 27 are subjected to stressing, which is accompanied by the articulation between the lever 8 and scoop 2 being straightened out. Once a dead-center position has been overcome, the two axial extensions carrying the collars 10 can latch into the corresponding latching pockets 11 of the wheel carriers 5. In this position, the connecting rod 7 is still subjected to stressing, so that the scoop is retained in its use position such that it does not rattle. It is also the case that the wheel carriers are secured in the use position by the handle, this being ensured by the collars 10 positioned in the latching pockets 11.

In the case of the further exemplary embodiment, which is illustrated in FIGS. 28 to 35, the handle for pivoting the scoop 2 is in the form of a D. The two D-arcs 6' of the handle 6 each have latching projections 30 which are directed outwards on the arcs and are secured in the manner of clamping rings on the round tube of the D-arc 6'. The latching projections 30 have an end in the form of a half-tube (see FIG. 30). This half-tube end is configured such that is can be clipped with latching action onto a latching stub 31 secured on the wheel carrier 5. The latching stub 31 has a latching collar 31' at the end. This latching collar 31' can enter into an undercut or a slot of the latching projection 30.

FIGS. 32 to 35 illustrate a particular latching action of the U-shaped handgrip in the telescoped-in position. Such a latching action, however, is also possible in the telescoped-out position. The tube portion 19 of the handgrip 18 is inserted in a tube 15 of the carrying frame 1. The two tubes 15 of the carrying frame 1 are connected to one another by a crossmember 21. The crossmember 21 comprises two plastics-material half-shells which are screwed to one another. Two bolts 32 are disposed in a displaceable manner in the crossmember 21. The bolts are forced in opposite directions by a spring 33, so that their bolt heads 32' can enter into latching cutouts 36 of the tubes 19.

A button 29 disposed in the center of the crossmember 22 is used to retract the bolts 32. This button 29 has two spaced-apart oblique flanks 35. Each of the two oblique flanks 35 interacts with an oblique flank 34 of one of the two bolts 32 such that displacement of the button 29 transversely to the displacement direction of the bolts 32 allows the two pairs of oblique flanks 35, 34 to slide against one another, so that the bolts 32 are retracted out of the latching cutouts 36 under loading of the compression spring 33.

All features disclosed are (in themselves) pertinent to the invention. The disclosure content of the associated/priority documents (copy of the prior application) is hereby also included in full in the disclosure of the application, also for the purpose of incorporating features of these documents in claims of the present application.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A dolly, comprising:
a carrying frame, at one end of which is articulated a scoop configured to be pivoted about a pivot axis and is coupled for movement, via a gear mechanism, to two wheel carriers, each configured to be pivoted about a bearing axis extending transversely to the pivot axis of the scoop and carry running wheels, such that, during pivoting of the scoop, the wheel carriers are pivotable between: (i) a storage position, in which the wheel carriers are oriented parallel to the carrying frame; and (ii) a use position in which the wheel carriers are oriented perpendicular to the carrying frame and parallel to one another;
an actuating handle configured to be pivoted about a handle axis extending parallel to the scoop axis, the handle engaging the two wheel carriers in the use position; and
a connecting rod coupling the handle to the scoop.

2. The dolly of claim 1, further comprising a lever coupled to the connecting rod and including a plurality of arms, the arms configured to fix the wheel carriers against pivoting in the use position.

3. The dolly of claim 1, wherein when the handle is displaced from an intermediate position into an end position, the connecting rod is displaced over a dead center.

4. The dolly of claim 3, wherein the dead center corresponds to a handle pivoting position in which the handle is positioned outside a pivoting space of the running wheels.

5. The dolly of claim 1, wherein the connecting rod is elastic.

6. The dolly of claim 1, further comprising a lever coupled to the carrying frame by an elastic mounting element.

7. The dolly of claim 1, wherein the handle includes a plurality of latching elements and each of the wheel carriers includes a latching pocket, the latching elements configured to engage the latching pockets.

8. The dolly of claim 1, wherein the handle includes a plurality of collars and each of the wheel carriers includes an opening, the collars configured to engage the openings.

9. The dolly of claim 1, further comprising a lever coupled to the handle, the lever comprising a plastic material.

10. The dolly of claim 9, wherein the lever includes a groove, the connecting rod engaging the groove in the use position.

11. The dolly of claim 1, further comprising a first coupler coupling at least one of the wheel carriers to the scoop, the first coupler including radial teeth.

12. The dolly claim 1, further comprising a lever coupled to the carrying frame by a bearing, the lever further coupled to the handle.

13. The dolly of claim 1, further comprising an adjustable handgrip coupled to the carrying frame, the handgrip positioned at a first end of the carrying frame, the scoop positioned at a second end of the carrying frame.

14. The dolly of claim 13, wherein the handgrip is configured to telescopically extend from the carrying frame.

15. The dolly of claim 1, wherein the carrying frame includes a first portion and a second portion, and further comprising a crossmember coupled to the first portion and the second portion.

16. The dolly of claim 1, wherein the scoop includes a receiving surface and a plurality rollers disposed on the receiving surface.

17. The dolly of claim 1, wherein the connecting rod is subject to stressing in the use position.

18. The dolly of claim 6, wherein the lever includes a plurality of arcuate sections.

19. The dolly of claim 1, further comprising a handgrip configured to telescopically extend from the carrying frame and a crossmember coupling the handgrip to the carrying frame.

20. The dolly of claim 19, wherein the crossmember includes a plurality of connectors selectively engaging the handgrip.

21. The dolly of claim 19, wherein the crossmember includes a plurality of spring-loaded detents selectively engaging the handgrip.

22. The dolly of claim 19, wherein the crossmember includes an actuator configured to enable telescopic movement of the handgrip.

23. The dolly of claim 19, wherein the handgrip includes an arcuate shape.

24. A dolly comprising:
a frame;
a scoop pivotally coupled to the frame;
a plurality of wheel carriers pivotally coupled to the frame, the wheel carriers being pivotal between a use position and a storage position;
a plurality of wheels, each one of the wheels being carried by at least one of the wheel carriers; and
a handle pivotally coupled to the frame, the handle having a handle portion configured to be positioned between the wheels when the wheel carriers have the use position.

25. The dolly of claim 24, wherein each of the wheel carriers includes a locking portion and the handle includes end sections, the end sections engaging the locking portions in the use position and fixing the wheel carriers against pivoting.

26. The dolly of claim 24, further comprising a connecting rod coupling the handle to the scoop.

27. The dolly of claim 24, further comprising a first coupler coupling at least one of the wheel carriers to the scoop, the first coupler including radial teeth.

28. The dolly of claim 24, further comprising a second coupler coupling the handle to the frame, the second coupler including a lever.

29. A dolly comprising:
a frame;
a scoop pivotally coupled to the frame;
a plurality of wheel carriers pivotally coupled to the frame, the wheel carriers being pivotal between a use position and a storage position, each one of the wheel carriers having a wheel carrier engagement section;
a plurality of wheels, each one of the wheels being carried by at least one of the wheel carriers; and
a handle pivotally coupled to the frame, the handle having a handle portion, the handle portion having a plurality of engagement sections, each one of the engagement sections being configured to be engaged with one of the wheel carrier engagement sections.

30. The dolly of claim 29, wherein the handle includes a handle portion configured to be positioned between the wheels when the wheel carriers have the use position and to fix the wheel carriers against pivoting.

31. The dolly of claim 29, further comprising a connecting rod coupling the handle to the scoop.

32. The dolly of claim 29, further comprising a first coupler coupling at least one of the wheel carriers to the scoop, the first coupler including radial teeth.

33. The dolly of claim 29, further comprising a second coupler coupling the handle to the frame, the second coupler including a lever.

* * * * *